(12) United States Patent
Cocconi et al.

(10) Patent No.: US 10,316,132 B2
(45) Date of Patent: Jun. 11, 2019

(54) POLYURETHANE MATS

(71) Applicants: Dow Italia Divisione Commerciale SRL, Milan (IT); Dow Global Technologies LLC, Midland, MI (US)

(72) Inventors: Carlo Cocconi, Correggio (IT); Giuseppe Lista, Modena (IT); Silvia Scussolin, Rolo (IT)

(73) Assignees: Dow Global Technologies LLC, Midland, MI (US); Dow Italia Divisione Commerciale SRL, Milan (IT)

( * ) Notice: Subject to any disclaimer, the term of this patent is extended or adjusted under 35 U.S.C. 154(b) by 247 days.

(21) Appl. No.: 15/507,608

(22) PCT Filed: Sep. 2, 2015

(86) PCT No.: PCT/US2015/048083
§ 371 (c)(1),
(2) Date: Feb. 28, 2017

(87) PCT Pub. No.: WO2016/036815
PCT Pub. Date: Mar. 10, 2016

(65) Prior Publication Data
US 2017/0240685 A1    Aug. 24, 2017

(30) Foreign Application Priority Data
Sep. 4, 2014  (IT) ............... MI2014A1540

(51) Int. Cl.
*C08G 18/48* (2006.01)
*C08G 18/76* (2006.01)
(Continued)

(52) U.S. Cl.
CPC ......... *C08G 18/4816* (2013.01); *B60N 3/048* (2013.01); *C08G 18/10* (2013.01);
(Continued)

(58) Field of Classification Search
CPC .......................... C08G 18/4816; C08G 18/10; C08G 18/8035; C08G 18/721; C08G 18/7664;
(Continued)

(56) References Cited

U.S. PATENT DOCUMENTS 4,385,133 A    5/1983  Alberino et al.
4,476,258 A    10/1984 Hiles
(Continued)

FOREIGN PATENT DOCUMENTS

CN    1087368 A    6/1994
DE    4129666 A1   3/1993
(Continued)

OTHER PUBLICATIONS

PCT/US2015/048083 International Search Report and Written Opinion of the International Searching Authority, dated Nov. 11, 2015.
(Continued)

*Primary Examiner* — Frank J Vineis
*Assistant Examiner* — Michael Zhang

(57) ABSTRACT

A polyurethane elastomer, e.g., for use in polyurethane mats, includes the reaction product of an isocyanate component that includes at least one isocyanate and an isocyanate-reactive component that includes (a) a first polyol component including from 40 wt % to 90 wt % of at least one polyether polyol having an average hydroxyl functionality that is greater than 2.5 and a number average molecular weight from 300 g/mol to 1,500 g/mol; (b) a second polyol component including from 2 wt % to 20 wt % of at least one ethylene oxide capped polyoxypropylene-polyoxyethylene polyol having an average hydroxyl functionality greater than 1.5 and less than 4.0, a number average molecular weight from 4,000 g/mol to 6,000 g/mol, and from 60% to 85% of a primary hydroxyl group content; and (c) a third polyol component including from 1 wt % to 20 wt % of at least one
(Continued)

polyoxypropylene polyol having an average hydroxyl functionality greater than 1.5 and less than 4.0 and a number average molecular weight from 300 g/mol to 1,500 g/mol.

10 Claims, 1 Drawing Sheet

(51) Int. Cl.
*C08G 18/10* (2006.01)
*B60N 3/04* (2006.01)
*C08G 18/66* (2006.01)
*C08G 18/72* (2006.01)
*C08G 18/80* (2006.01)

(52) U.S. Cl.
CPC ..... *C08G 18/4829* (2013.01); *C08G 18/4841* (2013.01); *C08G 18/6677* (2013.01); *C08G 18/721* (2013.01); *C08G 18/7664* (2013.01); *C08G 18/7671* (2013.01); *C08G 18/8035* (2013.01); *C08G 2350/00* (2013.01)

(58) Field of Classification Search
CPC ............ C08G 18/7671; C08G 18/4841; C08G 18/6677; C08G 18/4829; C08G 2350/00; B60N 3/048
See application file for complete search history.

(56) References Cited

U.S. PATENT DOCUMENTS

| | | |
|---|---|---|
| 4,722,946 A | 2/1988 | Hostettler |
| 4,808,469 A | 2/1989 | Hiles |
| 4,826,885 A | 5/1989 | Tsai |
| 5,079,328 A | 1/1992 | Sarpeshkar et al. |
| 5,081,204 A | 1/1992 | Sarpeshkar et al. |
| 5,468,835 A | 11/1995 | Singer |
| 2004/0147707 A1 | 7/2004 | Arendoski |
| 2006/0111512 A1 | 5/2006 | Dunham et al. |
| 2008/0071006 A1 | 3/2008 | Emmrich et al. |
| 2012/0085961 A1 | 4/2012 | Rogunova et al. |
| 2013/0310474 A1* | 11/2013 | Scussolin ............... C08G 18/12 521/114 |
| 2013/0331473 A1* | 12/2013 | Motta ................ C08G 18/1875 521/160 |

FOREIGN PATENT DOCUMENTS

| | | |
|---|---|---|
| JP | 61261047 | 11/1986 |
| JP | 06228261 | 8/1994 |
| WO | 2010/101689 A2 | 9/2010 |

OTHER PUBLICATIONS

PCT/US2015/048083, International Preliminary Report on Patentability, dated Mar. 16, 2017.

* cited by examiner

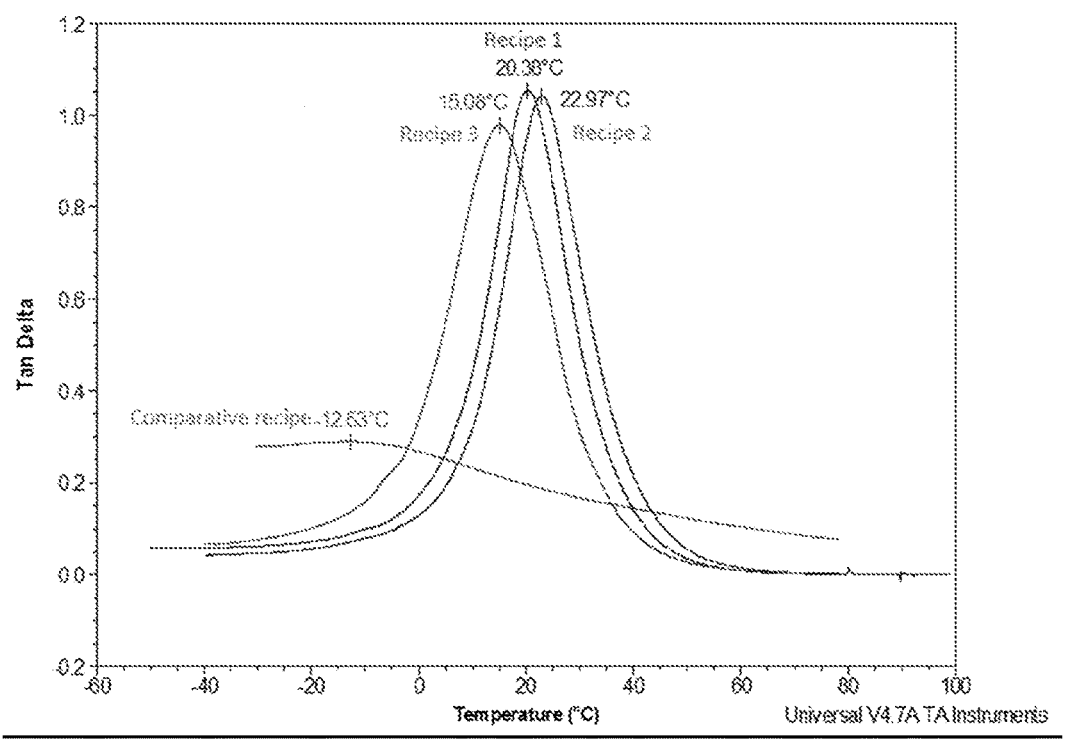

POLYURETHANE MATS

FIELD

Embodiments relate polyurethane mats, e.g., for use in vehicles to reduce structural/airborne noise and/or vibrational noise.

INTRODUCTION

Improvements in acoustic insulation of interior cabin in modern vehicles (such as buses, trucks, cars, agricultural machines, and industrial machines) are desirable. Sources of noise and vibrations in vehicles can be generated from internal and/or external factors. Exemplary factors include engines, tires, cooling/heating fans, brakes, and environmental conditions such as wind and rain. Many solutions have been proposed to reduce noise and vibrations in different parts of the vehicles, e.g., the use of flooring mats and flooring carpets inside vehicle cabin is a known method to minimize noise issues.

For example, flooring mats and/or carpets may be placed under and above the vehicle pan and are produced in shapes to fit different vehicle layouts. Different technologies are available for flooring mats and carpets such as fibrous materials, thermoplastic/thermosetting polymers, rubber, and acrylics. These materials may be applied in more than one layer to provide both structural/airborne noise and vibration damping insulation. Further, inert fillers (such as recycled scraps of above mentioned materials) and/or common inorganic fillers (such as barium sulphate, calcium carbonate, glass and others inert particles) are added to increase mass with the aim to have better acoustic properties and to reduce costs. However, while multilayer solutions and high mass materials give good performances to the producers, on the other side such solutions may require additional working steps and/or increase fuel/energy consumption in the final vehicle applications. Accordingly, a need exists for a single layer mat in which a single layer of material may be used to reduce structural/airborne noise and/or vibrational noise.

SUMMARY

A polyurethane elastomer, e.g., for use in polyurethane mats, includes the reaction product of an isocyanate component that includes at least one isocyanate and an isocyanate-reactive component that includes (a) a first polyol component including from 40 wt % to 90 wt % of at least one polyether polyol having an average hydroxyl functionality that is greater than 2.5 and a number average molecular weight from 300 g/mol to 1,500 g/mol; (b) a second polyol component including from 2 wt % to 20 wt % of at least one ethylene oxide capped polyoxypropylene-polyoxyethylene polyol having an average hydroxyl functionality greater than 1.5 and less than 4.0, a number average molecular weight from 4,000 g/mol to 6,000 g/mol, and from 60% to 85% of a primary hydroxyl group content; and (c) a third polyol component including from 1 wt % to 20 wt % of at least one polyoxypropylene polyol having an average hydroxyl functionality greater than 1.5 and less than 4.0 and a number average molecular weight from 300 g/mol to 1,500 g/mol.

BRIEF DESCRIPTION OF THE DRAWINGS

The Drawing illustrates tan delta graphs according to dynamic mechanical thermal analysis (DTMA) of each of Working Examples 1, 2, and 3, and Comparative Example A.

DETAILED DESCRIPTION

According to embodiments a polyurethane mat, e.g., a sound insulation interior cabin polyurethane mat, with a single layer of polyurethane elastomer (with or without filler) may exhibit viscoelastic properties (e.g., with respect to glass transition temperature) and hardness properties (e.g., a Shore A hardness greater than 70). The polyurethane mat may also exhibit a combined acoustic barrier effect of a high density material with an improved vibration energy dissipation, e.g., these higher damping properties may be exhibited within the common temperature range of interior cabin vehicles (such as winter and summer temperatures of minus 10° C. to plus 35° C.). The thickness of the polyurethane mat and/or the single layer of the polyurethane elastomer may be from 0.5 mm to 30 mm. The polyurethane mat may consist essentially of the single layer of the polyurethane elastomer.

Polyurethane elastomers contain urethane moieties and are made by starting materials that include an isocyanate component and an isocyanate-reactive component. The isocyanate component includes at least one isocyanate (e.g., a polyisocyanate and/or an isocyanate-terminated prepolymer). The isocyanate-reactive component includes at least one polyol component and may include an optional additive component that includes at least one optional additive (such as a blowing agent, a catalyst, a curative agent, a chain extender, a flame retardant, a filler, a stabilizer, a surfactant, a plasticizer, a zeolite, and/or other additives that modify properties of the resultant final polyurethane product). According to an embodiment, dynamic mechanical thermal analysis (DMTA) may be used for determining the viscoelastic properties of the multipurpose single layers. For example, DMTA may be used to measure glass transition temperature, as a function of temperature. A tan delta plot is also generated, where tan delta is a measure of the ratio of energy dissipated as heat to maximum energy stored in the material. Accordingly, tan delta increases to a peak (i.e., an uppermost point along a rising peak of a tan delta plot) at a temperature in which the energy dissipated as heat approaches the energy stored (e.g., at a time when the glass-rubber phase transition temperature is reached).

The isocyanate component includes at least one isocyanate. Exemplary isocyanates include diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'-, and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE. The isocyanate may have an average functionality of from 2.8 to 3.2 (e.g., 2.2 to 2.9, etc.). The isocyanate may be a prepolymer that has a free isocyanate group content (i.e., NCO content) of from 15 wt % to 35 wt % (e.g., 20 wt % to 30 wt % and/or 20 wt % to 25 wt %).

The isocyanate component includes three polyol components, in particular a first polyol component, a second polyol component, and a third polyol component. The first polyol component includes from 40 wt % to 90 wt % (e.g., 45 wt % to 80 wt %, 50 wt % to 75 wt %, 55 wt % to 60 wt %, etc.) of at least one polyether polyol having an average hydroxyl functionality that is greater than 2.5 (e.g., and less than 4.0) and a number average molecular weight from 300 g/mol to 1,500 g/mol. For example, the first polyol component includes a glycerine-propoxylated polyether triol and the number average molecular weight is from 800 g/mol to 1,200 g/mol (e.g., 900 g/mol to 1,100 g/mol, 950 g/mol to 1,050 g/mol, etc.).

The second polyol component includes from 2 wt % to 20 wt % (e.g., 2 wt % to 15 wt %, 3 wt % to 10 wt %, 5 wt % to 10 wt %, etc.) of at least one ethylene oxide capped polyoxypropylene-polyoxyethylene polyol having an average hydroxyl functionality greater than 1.5 and less than 4.0, a number average molecular weight from 4,000 g/mol to 6,000 g/mol (e.g., from 4,250 g/mol to 5,500 g/mol, from 4,500 g/mol to 5,000 g/mol, etc.), and from 60% to 85% (e.g., 70% to 75%) of a primary hydroxyl group content. For example, the second polyol component includes a glycerine initiated propoxylated-ethoxylated polyether triol.

The third polyol component includes from 1 wt % to 20 wt % (e.g., 1 wt % to 10 wt %, 2 wt % to 5 wt %, etc.) of at least one polyoxypropylene polyol having an average hydroxyl functionality greater than 1.5 and less than 4.0 and a number average molecular weight from 300 g/mol to 1,500 g/mol. For example, the third polyol component includes a glycerine initiated propoxylated polyether triol and the number average molecular weight is from 300 g/mol to 750 g/mol (e.g., from 350 g/mol to 600 g/mol, from 400 g/mol to 500 g/mol, etc.).

The isocyanate-reactive component may include other polyols, such a polyether polyol, a polyester polyol, a polycarbonate polyol, and/or a natural-oil derived polyol, in addition to the first to third polyol components. The polyether polyols may include at least 2 and no more than 3 hydroxyl groups. The polyether polyols may be prepared, e.g., by the polymerization of epoxides, such as ethylene oxide, propylene oxide, and/or butylene oxide.

The isocyanate-reactive component may be reacted with the isocyanate component at an isocyanate index from 70 to 250 (e.g., 80 to 150, 80 to 120, 90 to 120, 95 to 110, etc.). According to an exemplary embodiment, the isocyanate index is from 70 to 110. The isocyanate index is measured as the equivalents of isocyanate in the reaction mixture for forming the polyurethane elastomer, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage.

The optional additive component may include an optional catalyst component that includes at least one catalyst. For example, the additive component may include each of a gelling catalyst, a blowing catalyst, and a tin and/or amine based catalyst. For example, the catalyst component may account for less than 5 wt % of a total weight of the isocyanate-reactive component. Exemplary catalysts include tertiary amines, Mannich bases formed from secondary amines, nitrogen-containing bases, alkali metal hydroxides, alkali phenolates, alkali metal alcoholates, hexahydrothiazines, and organometallic compounds. A curing agent including may be a bifunctional organic diamine compound (such as a toluene based diamine, a phenyl based diamine, an alkyl based dianiline, a polyether based diamine, or an isophorone based diamine) or a trifunctional organic diamine compound (such as a phenyl based triamine, an alkyl based tramine, or a propylene based triamine).

The optional chain extender component may include a chain extender, e.g., that has two isocyanate-reactive groups per molecule and may have an equivalent weight per isocyanate-reactive group of less than 400. Exemplary chain extenders include 1,4-butane diol ("butane diol" or "BDO"), ethlyene glycol, and diethylene glycol. If included, the chain extender component may be present in an amount from 0.1 wt % to 5 wt %, based on a total weight of the isocyanate-reactive component. The optional crosslinker component may include at least one crosslinker that has three or more isocyanate-reactive groups per molecule and an equivalent weight per isocyanate-reactive group of less than 400. For example, the crosslinker may include from 3 to 8 (e.g. 3 or 4) primary hydroxyl, primary amine, or secondary amine groups per molecule, and may have an average equivalent weight from 30 to about 300. If included, the crosslinker component may be present in an amount from 0.1 wt % to 5 wt %, based on a total weight of isocyanate-reactive component.

Various other additives, e.g., those known to those skilled in the art, may be included in the optional additive component. For example, fillers such as inorganic and/or organic fillers, coloring agents, water-binding agents, surface-active substances, extenders and/or plasticizers may be used. Dyes and/or pigments (such as titanium dioxide and/or carbon black), may be included in the optional additive component to impart color properties to the polyurethane elastomer. Pigments may be in the form of solids or the solids may be pre-dispersed in a polyol carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane elastomer.

Once the isocyanate component and the isocyanate-reactive component are mixed, the result reaction mixture is cured to form the polyurethane elastomers. Cast elastomers are made by a casting process in which the starting materials are at least partially cured in an open or closed mold. Elastomers based on thermoplastic polyurethane (TPU) include segmented copolymers composed of hard and soft segments. The TPU elastomers may get their strength from the phase separation of soft segments from hard segments. The hard segment may include the combination of the isocyanate and chain extender components and the "soft segment" is the balance of the TPU. The polyurethane elastomer may serve as an effective noise- and vibration-absorbant, e.g., without the use of an additional heavy polyurethane layer. The polyurethane elastomer may serve to absorb a portion of the noise and vibration to which it is exposed, both as the noise and vibration moves from its source toward the polyurethane elastomer.

For example, the polyurethane elastomer may be formed by a spraying and/or pouring application in which the isocyanate component and the isocyanate-reactive component are combined on a surface (e.g., on the surface of a heated mold or the use of a mold may be avoided). If a mold is used, a polyurethane mat have a specified shape may be formed that includes the polyurethane elastomer as a single layer (e.g., and excludes any other polyurethane layers). If a mold is not used during the spraying or pouring application, it is possible to cut and/or shape the resultant polyurethane elastomer into specific shapes (e.g., after cooling). The spraying and/or pouring application may be done on a conveyor device, e.g., in a continuous manner.

According to exemplary embodiments, the polyurethane elastomer and/or mat exhibits a high Shore A hardness (e.g., a Shore A hardness greater than 70, a Shore A hardness from 70 to 100, 70 to 85, and/or 75 to 80). The polyurethane elastomer also exhibits viscoelastic behavior as demonstrated by a glass transition temperature ($T_g$) greater than 10° C. and a tan delta greater than 0.90. For example, the polyurethane elastomer has a $T_g$ from 13° C. to 35° C. combined with a tan delta from 0.95 to 1.20.

All parts and percentages are by weight unless otherwise indicated.

EXAMPLES

The following materials are principally used:

| Polyols | |
|---|---|
| Polyol A | A glycerine initiated propoxylated polyether triol, having a hydroxyl number of approximately 156 mg KOH/g and a number average molecular weight of approximately 1,000 g/mole (available from The Dow Chemical Company as VORANOL ™ CP 1055). |
| Polyol B | A glycerine initiated propoxylated-ethoxylated polyether triol, having ethylene oxide capping, a number average molecular weight of approximately 4,800 g/mole, a hydroxyl number from 32.0 to 37.0 mg KOH/g (available from The Dow Chemical Company as VORANOL ™ CP 4711). |
| Polyol C | A glycerine initiated propoxylated polyether triol, having a hydroxyl number of approximately 380 mg KOH/g and a number average molecular weight of approximately 450g/mole (available from The Dow Chemical Company as VORANOL ™ CP 450). |
| Comparative Polyol D | A propylene oxide with ethylene oxide capping polyether diol, having a hydroxyl number of approximately 28 mg KOH/g (available from The Dow Chemical Company as VORANOL ™ EP 1900). |
| Comparative Polyol E | A glycerine propoxylated-ethoxylated polyether triol, having a hydroxyl number from 26.0 to 29.0 mg KOH/g (available from The Dow Chemical Company as VORANOL ™ CP 6001). |

| Isocyanate-terminated prepolymer | |
|---|---|
| Prepolymer 1 | A methylene diphenyl diisocyanate (MDI) based prepolymer having a free NCO (isocyanate moiety) content from 23 to 24 wt % and prepared according to the following approximate formulation in Table 1, below: |

TABLE 1

| Prepolymer | wt % |
|---|---|
| VORALAST ™ GE 128 | 50 |
| ISONATE ™ OP 50 | 5 |
| ISONATE ™ M 380 | 25 |
| VORANATE ™ M2940 | 18 |
| VORANOL ™ IP 010 | 2 |

VORALAST ™ GE 128 An MDI based prepolymer (available from The Dow Chemical Company).
ISONATE ™ OP 50 A monomeric MDI isocyanate (available from The Dow Chemical Company).
ISONATE ™ M 380 An isocyanate (available from The Dow Chemical Company).
VORANATE ™ M 2940 A polymeric MDI isocyanate (available from The Dow Chemical Company).
VORANOL ™ IP 010 A polyol (available from The Dow Chemical Company).

| Additives | |
|---|---|
| Abrasion Reducer | An additive that may act as an abrasion reducer (available from Evonik as TEGOSTAB ® B 2114). |
| Catalyst 1 | A catalyst that may act as a gelling catalyst (available from Air Products as Dabco ® 33-LV). |
| Catalyst 2 | A catalyst that may act as a blowing catalyst (available from Momentive as NIAX ™ A-1). |
| Catalyst 3 | A tin-based catalyst (available available from Momentive as Fomrez UL ™ 38). |
| Chain Extender 1 | A monoethylenglycol (MEG) that may act as a chain extender (available from Sigma-Aldrich). |
| Chain Extender 2 | A 1,4-butanediol that may act as a chain extender (available from Sigma-Aldrich). |
| Crosslinking Agent | A diethanolamine (DEOA) that may act as a crosslinking agent (available from Sigma-Aldrich). |
| Dispersing Agent | An additive that may act as a wetting and dispersing additive, e.g., as an anti-settling additive (available from Actega as BYK-W 969). |
| Filler 1 | A barium sulphate based filler (available from Sigma-Aldrich). |
| Plasticizer | A propylene carbonate that may act as a plasticizer (available from Sigma-Aldrich). |
| Zeolite | A zeolite powder having a CAS number of 1318-02-1 (available from Sigma-Aldrich |

Working Examples 1, 2, and 3 and Comparative Example A is prepared according to following approximate formulations in Table 2, below.

TABLE 2

| | Example 1 (wt %) | Example 2 (wt %) | Example 3 (wt %) | Example A (wt %) |
|---|---|---|---|---|
| Polyol A | 70.70 | 56.32 | 42.24 | — |
| Polyol B | 8.81 | 7.04 | 5.28 | — |
| Polyol C | 4.41 | 3.53 | 2.65 | — |
| Comparative Polyol D | — | — | — | 41.27 |
| Comparative Polyol E | — | — | — | 11.42 |
| Abrasion Reducer | 1.00 | 0.80 | 0.60 | — |
| Catalyst 1 | 2.19 | 1.75 | 1.31 | 0.20 |
| Catalyst 2 | 0.27 | 0.22 | 0.16 | — |
| Catalyst 3 | 0.01 | 0.01 | 0.01 | — |
| Chain Extender 1 | 0.66 | 0.53 | 0.40 | — |
| Chain Extender 2 | — | — | — | 4.30 |
| Crosslinking Agent | 0.88 | 0.70 | 0.53 | — |
| Dispersing Agent | 0.84 | 0.67 | 0.50 | — |
| Filler 1 | — | 20.00 | 40.00 | 40.00 |
| Plasticizer | 5.85 | 4.68 | 3.51 | — |
| Zeolite | 4.68 | 3.75 | 2.81 | 2.81 |

Working Examples 1, 2, and 3 and Comparative Example A are then reacted with the Prepolymer to prepare samples in a laboratory scale-up using a pouring polyurethane machine commercially available from Cannon Italy under designation laboratory version of Cannon A-40 machine. The polyol component at room temperature is reacted with the prepolymer at room temperature in a non-heated aluminum molds to form mats measuring 1000 mm×1000 mm×10 mm in size.

In particular, 100 parts by weight of the formulation in Table 2 of Working Example 1 is reacted with 55 parts by weight of the Prepolymer to form a sample for evaluation. 100 parts by weight of the formulation in Table 2 of Working Example 2 is reacted with 44 parts by weight of the Prepolymer to form a sample for evaluation. 100 parts by weight of the formulation in Table 2 of Working Example 3 is reacted with 33 parts by weight of the Prepolymer to form a sample for evaluation. 100 parts by weight of the formulation in Table 2 of Comparative Example A is reacted with 20 parts by weight of the Prepolymer to form a sample for evaluation.

Referring to Table 3, below, the samples as prepared above are evaluated for Shore A hardness, density (g/L), glass transition temperature ($T_g$), and Tan delta peak.

TABLE 3

|  | Example 1 | Example 2 | Example 3 | Example A |
|---|---|---|---|---|
| Shore A hardness | 75-80 | 75-80 | 75-80 | 75-80 |
| Density (g/L) | 1000 | 1200 | 1400 | 1450 |
| $T_g$ (° C.) | 20.38 | 22.97 | 15.08 | −12.30 |
| Tan delta peak | 1.05 | 1.04 | 0.98 | 0.29 |

Referring the Drawing, Recipe 1 depicts a tan delta graph for Working Example 1, Recipe 2 depicts a tan delta graph for Working Example 2, Recipe 3 depicts a tan delta graph for Working Example 3, and Comparative recipe depicts a tan delta graph for Comparative Example A.

It is shown that single layer PU solutions, with/without filler, provide better performance than Comparative Example A. For example Working Examples 1, 2, and 3 exhibit high damping properties at different density and filler level by keeping the high tan delta value and keeping the glass transition temperature in the range of common working temperature inside vehicle cabins. For example, Working Examples 1, 2, and 3 exhibit high damping properties within the common temperature range of interior cabin vehicles (such as winter and summer temperatures of −10° C. to 35° C.).

The invention claimed is:

1. A polyurethane elastomer, comprising the reaction product of an isocyanate component that includes at least one isocyanate and an isocyanate-reactive component that includes:
   (a) a first polyol component including from 40 wt % to 90 wt % of at least one polyether polyol having an average hydroxyl functionality that is greater than 2.5 and a number average molecular weight from 300 g/mol to 1,500 g/mol;
   (b) a second polyol component including from 2 wt % to 20 wt % of at least one ethylene oxide capped polyoxypropylene-polyoxyethylene polyol having an average hydroxyl functionality greater than 1.5 and less than 4.0, a number average molecular weight from 4,000 g/mol to 6,000 g/mol, and from 60% to 85% of a primary hydroxyl group content; and
   (c) a third polyol component including from 1 wt % to 20 wt % of at least one polyoxypropylene polyol having an average hydroxyl functionality greater than 1.5 and less than 4.0 and a number average molecular weight from 300 g/mol to 1,500 g/mol.

2. The polyurethane elastomer of claim 1, wherein the first polyol component includes a glycerine-propoxylated polyether triol and the number average molecular weight is from 800 g/mol to 1,200 g/mol.

3. The polyurethane elastomer of claim 2, wherein the second polyol component includes a glycerine initiated propoxylated-ethoxylated polyether triol.

4. The polyurethane elastomer of claim 3, wherein the third polyol component includes a glycerine initiated propoxylated polyether triol and the number average molecular weight is from 300 g/mol to 750 g/mol.

5. The polyurethane elastomer of claim 1, where the isocyanate component includes an isocyanate-terminated prepolymer having a free NCO content from 20 wt % to 30 wt %.

6. The polyurethane elastomer of claim 1, wherein the isocyanate index for the reaction of the isocyanate component with the isocyanate-reactive component is from 70 to 110.

7. A polyurethane mat, comprising the polyurethane elastomer as claimed in claim 1.

8. A polyurethane sound insulation mat, comprising the polyurethane elastomer as claimed in claim 1.

9. A single layer polyurethane mat for use in vehicles, comprising a single layer of the polyurethane elastomer as claimed in claim 1.

10. The single layer polyurethane mat of claim 9, wherein a thickness of the single layer is from 0.5 mm to 30 mm.

* * * * *